United States Patent
Grothe et al.

(10) Patent No.: US 7,645,334 B2
(45) Date of Patent: Jan. 12, 2010

(54) BARIUM SULFATE

(75) Inventors: Sonja Grothe, Bottrop (DE); Jochen Winkler, Rheurdt (DE)

(73) Assignee: Sachtleben Chemie GmbH, Duisburg (DE)

( * ) Notice: Subject to any disclaimer, the term of this patent is extended or adjusted under 35 U.S.C. 154(b) by 0 days.

(21) Appl. No.: 12/278,784

(22) PCT Filed: Feb. 21, 2007

(86) PCT No.: PCT/EP2007/051672

§ 371 (c)(1),
(2), (4) Date: Aug. 18, 2008

(87) PCT Pub. No.: WO2007/096385

PCT Pub. Date: Aug. 30, 2007

(65) Prior Publication Data
US 2008/0314291 A1   Dec. 25, 2008

(30) Foreign Application Priority Data

Feb. 21, 2006   (DE) .................... 10 2006 008 413

(51) Int. Cl.
| C09C 1/02 | (2006.01) |
| C09C 3/08 | (2006.01) |
| C09C 3/10 | (2006.01) |
| C09C 3/12 | (2006.01) |
| C01F 11/46 | (2006.01) |
| B05D 5/00 | (2006.01) |

(52) U.S. Cl. ............. 106/471; 427/220; 427/221; 428/403; 428/405; 428/407; 523/209; 523/212; 524/423

(58) Field of Classification Search ......... 106/471; 427/220, 221; 428/403, 405, 407; 523/209, 523/212; 524/423
See application file for complete search history.

(56) References Cited

U.S. PATENT DOCUMENTS

| 4,894,093 A | 1/1990 | Aderhold |
| 6,194,070 B1 * | 2/2001 | Lynch et al. ............ 428/405 |
| 6,274,662 B1 * | 8/2001 | Lynch et al. ............ 524/423 |
| 6,849,673 B2 * | 2/2005 | Lynch ................ 523/213 |
| 7,001,582 B2 * | 2/2006 | Hardinghaus et al. ...... 423/554 |
| 2003/0159622 A1 | 8/2003 | Amirzadeh-Asl |

FOREIGN PATENT DOCUMENTS

| DE | 33 47 191 A1 | 6/1984 |
| EP | 0293622 | 12/1988 |
| GB | 2 174 999 A | 11/1986 |
| JP | 2003-55151 A * | 2/2003 |
| WO | WO 01/58809 A | 8/2001 |

* cited by examiner

*Primary Examiner*—Anthony J Green
(74) *Attorney, Agent, or Firm*—Fulbright & Jaworski L.L.

(57) ABSTRACT

The invention relates to a method for producing barium sulphate having an organically modified surface, barium sulphate produced according to said method and to the use thereof.

21 Claims, No Drawings

BARIUM SULFATE

This application is a §371 of PCT/EP2007/051672 filed Feb. 21, 2007 which claims priority from German Patent Application No. 10 2006 008 413.6 filed Feb. 21, 2006.

The present invention provides a process for the preparation of barium sulfate having an organically modified surface, the barium sulfate prepared by this process and the use thereof.

Barium sulfate is used as an inert filler in many fields of use. When barium sulfate is employed in polymeric materials, the properties of these materials are influenced in a positive manner. In contrast to other fillers, for example silicates or oxides, barium sulfate shows no interactions at all with the polymeric materials. However, establishing interactions in a targeted manner between filler and polymer is one possibility of adjusting the properties of these composites. It is therefore desirable also to be able to modify the surface of barium sulfate particles in a targeted manner, in order to be able to establish these interactions in a targeted manner.

EP-A-0293622, the technical teaching of which is a constituent of this description in its full scope, discloses a process for the preparation of barium sulfate having a chemoreactive surface by co-precipitation of barium ions with organic compounds. Organic compounds which are used in this context are, for example, alkyl or aryl sulfates, which are optionally substituted by functional groups. This process has the disadvantage that the particle size and the particle morphology of the precipitated barium sulfate particles can be influenced by the co-precipitation of barium sulfate and organic compounds. Furthermore, with this process the possibility of organically modifying the barium sulfate subsequently, that is to say after the precipitation, is not available. A further disadvantage is that the proposed organic compounds often tend towards foaming, which represents a process-technology problem. In addition, waste water which often has a high organic load is obtained during the concentration of the precipitation suspensions prepared in this way.

The object of the present invention is to overcome the disadvantages of the prior art.

The object of the present invention in particular is to provide a process for the preparation of barium sulfate having an organically modified surface, by which the particle size and the particle morphology of the precipitated barium sulfate is not influenced.

A further object of the present invention is to provide a process for the preparation of barium sulfate having an organically modified surface, in which the barium sulfate is modified subsequently, that is to say after the precipitation.

A further object of the present invention is to provide a process for the preparation of barium sulfate having an organically modified surface, which prevents foaming by the organic compounds used for the modification during the precipitation.

A further object of the present invention is to provide a process for the preparation of barium sulfate having an organically modified surface, which reduces the high organic load of the waste water of the concentration of the precipitation suspensions.

According to the invention, the object is surprisingly achieved by the features of the main claim. Preferred embodiments are to be found in the sub-claims.

In this context, according to the invention the objects are achieved by a process which allows the organic modification of the surface of the barium sulfate first to be carried out after the precipitation of the barium sulfate. This procedure has the advantage that the formation of particles can be carried out in the usual manner during the precipitation of barium sulfate. That is to say, on the one hand the formation of particles is not adversely influenced by co-precipitates, and on the other hand it is easier to control the particle size and morphology of the barium sulfate particles.

The precipitation of the barium sulfate to be employed according to the invention can be carried out by all the processes known from the prior art. According to the invention, barium sulfate which has been prepared in a precipitation reactor for precipitation of nanoscale particles, in particular a reaction cell for ultra-fast mixing of several reactants, for example aqueous solutions of barium hydroxide and sodium sulfide and/or zinc sulfide and/or sulfuric acid, is preferably employed. According to the invention, the barium sulfate is preferably in the form of a precipitation suspension after the precipitation.

The barium sulfate employed according to the invention is washed and concentrated, so that the waste water obtained has no organic load. The barium sulfate is now in the form of a concentrated barium sulfate suspension. The barium sulfate according to the invention can be prepared by processes known per se. According to the invention, a barium component is added to the barium sulfate suspension so that an excess of barium ions arises. Any water-soluble barium compound, for example barium sulfide, barium chloride and/or barium hydroxide, can be employed as the barium component. The barium ions are adsorbed on the surfaces of the barium sulfate particles.

Suitable organic compounds are then added to this suspension with vigorous stirring and/or during a dispersing operation. The organic compounds are to be chosen so that they form a sparingly soluble compound with barium ions. By the addition of the organic compounds to the barium sulfate suspension, the organic compounds precipitate out with the excess barium ions on the surface of the barium sulfate.

Suitable organic compounds are compounds chosen from the group consisting of alkyl- and/or arylsulfonates, alkyl and/or aryl sulfates, alkyl- and/or aryl-phosphoric acid esters or mixtures of at least two of these compounds, wherein the alkyl or aryl radicals can be substituted by functional groups. The organic compounds can also be fatty acids, which optionally have functional groups. Mixtures of at least two such compounds can also be employed.

For example, the following are employed in the process of the invention:
alkylsulfonic acid salt,
sodium polyvinylsulfonate,
sodium N-alkyl-benzenesulfonate,
sodium polystyrenesulfonate,
sodium dodecylbenzenesulfonate,
sodium lauryl sulfate,
sodium cetyl sulfate,
hydroxylamine sulfate,
triethanolammonium lauryl sulfate,
phosphoric acid monoethyl monobenzyl ester,
lithium perfluorooctanesulfonate,
12-bromo-1-dodecanesulfonic acid,
sodium 10-hydroxy-1-decanesulfonate,
sodium carrageenan,
sodium 10-mercapto-1-cetanesulfonate,
sodium 16-cetene-1-sulfate,
oleylcetyl alcohol sulfate,
oleic acid sulfate,
9,10-dihydroxystearic acid,
isostearic acid,
stearic acid,
oleic acid.

The barium sulfate modified according to the invention either can be employed directly in the form of the aqueous paste which exists, or can be dried before use. The drying can be carried out by processes known per se. The use of convection dryers, spray dryers, grinding dryers, freeze dryers and/or pulsation dryers is suitable in particular for the drying. However, other dryers can likewise be employed according to the invention. Subsequent grinding of the dried powders may be necessary, depending on the drying process. The grinding can be carried out by processes known per se. The barium sulfate preferably has an average particle diameter of $d_{50}=1$ nm to 100 µm, preferably of $d_{50}=1$ nm to 1 µm, particularly preferably of $d_{50}=5$ nm to 0.5 µm, and preferably exists in a form dispersed to the primary particle size before the organic modification.

The primary particles have a logarithmic particle size distribution with a median of d=1 to 5,000 nm, preferably d=1 to 1,000 nm, particularly preferably of d=5 to 500 nm, with a geometric standard deviation of $\sigma_g<1.5$, preferably of $\sigma_g<1.4$.

The barium sulfate modified according to the invention can be after-treated further with functional silane derivatives or functional siloxanes after the organic modification. For example, the following are employed in the process according to the invention:
  octyltriethoxysilane,
  methyltriethoxysilane,
  γ-methacryloxypropyltrimethoxysilane,
  γ-glycidyloxypropyltrime-thoxysilane,
  γ-aminopropyltriethoxysilane,
  γ-isocyanatopropyltriethoxysilane.

The barium sulfate modified according to the invention can be employed in the field of composite materials, for example for improving the mechanical properties of plastics, preferably of thermoplastics, thermosets and/or elastomers. The barium sulfate modified according to the invention can furthermore be employed as a nucleating agent in polymeric materials. The crystallinity of polymeric materials is also increased by the use of the barium sulfate modified according to the invention. It is moreover used in the field of lacquers and paints, where it likewise has a positive influence on mechanical properties and further properties, such as, for example, the glass transition temperature and the resistance to chemicals. Further examples of fields of use of the barium sulfate modified according to the invention are: adhesives, composites in combination with metals or ceramic materials, cosmetics, synthetic fibres.

The process according to the invention for the production of the surface-modified barium sulfate according to the invention has the following advantages compared with the prior art, in particular the prior art disclosed in EP-A-0293622:
  no soluble barium arises; soluble barium is toxic and therefore undesirable;
  no COD load arises in the waste water;
  less foaming is observed;
  the particle size and morphology of the barium sulfate particles, that is to say whether, for example, cubic, platelet-shaped or spherical particles are formed, is more easily controllable during the precipitation since the precipitation is not influenced by co-precipitates;
  the organic compounds preferentially precipitate out on the barium sulfate surface, since the excess barium ions accumulate on the particle surface.

The invention provides, in detail:
  a process for the preparation of barium sulfate having an organically modified surface, which includes the following steps:
    a) addition of a barium component to a concentrated barium sulfate suspension and subsequently
    b) addition of organic compounds to the suspension.
  a process for the preparation of barium sulfate having an organically modified surface, which includes the following steps:
    a) addition of a barium component to a concentrated barium sulfate suspension, subsequently
    b) addition of organic compounds to the suspension and
    c) after-treatment of the organically modified barium sulfate particles with functional silane derivatives and/or functional siloxanes.
  a process for the preparation of barium sulfate having an organically modified surface as described above, wherein
    the barium component in step a) is a water-soluble barium compound, preferably chosen from barium sulfide, barium chloride and/or barium hydroxide;
    the organic compounds in step b) are those which form sparingly soluble compounds with barium ions, wherein
      the organic compounds are chosen from the group of alkyl- and/or arylsulfonates, alkyl and/or aryl sulfates, alkyl- and/or aryl-phosphoric acid esters, wherein the alkyl or aryl radicals can be substituted by functional groups, and/or fatty acids, which optionally have functional groups, or mixtures of at least two of these compounds;
      the organic compounds are chosen from:
        alkylsulfonic acid salts,
        sodium polyvinylsulfonate,
        sodium N-alkylbenzenesulfonates,
        sodium polystyrenesulfonate,
        sodium dodecylbenzenesulfonate,
        sodium lauryl sulfate,
        sodium cetyl sulfate,
        hydroxylamine sulfate,
        triethanolammonium lauryl sulfates,
        phosphoric acid monoethyl monobenzyl ester,
        lithium perfluorooctanesulfonate,
        12-bromo-1-dodecanesulfonic acid,
        sodium 10-hydroxy-1-decanesulfonate,
        sodium carrageenan,
        sodium 10-mercapto-1-cetanesulfonate,
        sodium 16-cetene-1-sulfate,
        oleylcetyl alcohol sulfate,
        oleic acid sulfate,
        9,10-dihydroxystearic acid,
        isostearic acid,
        stearic acid,
        oleic acid,
        or mixtures of at least two of these compounds;
    the organic compounds are added to the suspension with vigorous stirring and/or during a dispersion operation;
    the barium sulfate in step a) has an average particle diameter of $d_{50}=1$ nm to 100 µm, preferably of $d_{50}=1$ nm to 1 µm, particularly preferably of $d_{50}=5$ nm to 0.5 µm;
    the primary particles of the barium sulfate in step a) have a logarithmic particle size distribution with a median of d=1 to 5,000 nm, preferably of d=1 to 1,000 nm, particularly preferably of d=5 nm to 500 nm and a logarithmic particle size distribution with a geometric standard deviation of $\sigma_g<1.5$, preferably of $\sigma_g<1.4$.

the organically modified barium sulfate particles in step c) are after-treated with functional silane derivatives and/or functional siloxanes;
the functional silane derivatives and/or functional siloxanes are chosen from:
octyltriethoxysilane,
methyltriethoxysilane,
γ-methacryloxypropyltrimethoxysilane,
γ-glycidyloxypropyltrimethoxysilane,
γ-aminopropyltriethoxysilane,
γ-isocyanatopropyltriethoxysilane,
or mixtures of at least two of these compounds;
a barium sulfate obtainable by the process according to the invention for the preparation of barium sulfate having an organically modified surface;
a barium sulfate having an organically modified surface, wherein the barium sulfate has an average particle diameter of $d_{50}$=1 nm to 100 μm, preferably of $d_{50}$=1 nm to 1 μm, particularly preferably of $d_{50}$=5 nm to 0.5 μm;
barium sulfate having an organically modified surface, wherein the primary particles of the barium sulfate have a logarithmic particle size distribution with a median of d=1 to 5,000 nm, preferably of d=1 to 1,000 nm, particularly preferably of d=5 nm to 500 nm and a logarithmic particle size distribution with a geometric standard deviation of $\sigma_g$<1.5, preferably of $\sigma_g$<1.4
barium sulfate having an organically modified surface, wherein the barium sulfate is after-treated with functional silane derivatives and/or functional siloxanes, wherein the functional silane derivatives and/or functional siloxanes are preferably chosen from: octyltriethoxysilane, methyltriethoxysilane, γ-methacryloxypropyltrimethoxysilane, γ-glycidyloxypropyltrimethoxysilane, γ-aminopropyltriethoxysilane, γ-isocyanatopropyltriethoxysilane, or mixtures of at least two such compounds;
use of the barium sulfate according to the invention for use in polymeric materials, preferably in composite materials;
use of the barium sulfate according to the invention for use in polymeric materials, preferably in thermoplastics, thermosets and/or elastomers;
use of the barium sulfate according to the invention for use in lacquers and paints;
use of the barium sulfate according to the invention in adhesives, composites in combination with metals or ceramic materials, in cosmetics, and/or synthetic fibres;
use of the barium sulfate according to the invention as a nucleating agent in polymeric materials.

The invention is explained in more detail by the following embodiment examples, without limiting it thereto:

EXAMPLE 1

500 g of platelet-shaped barium sulfate are suspended in 0.5 l of CD water (completely desalinated water) in a stirred container at room temperature. A barium excess is then established with a 0.1 molar barium hydroxide solution so that a pH of 11 is achieved. 25 g of sodium lauryl sulfate are slowly introduced into the vigorously stirred barium sulfate suspension. The suspension is then stirred for a further 30 min. The pH is then slowly adjusted to 6.0 with 0.1-molar sulfuric acid and the mixture is stirred for a further 15 min. The product obtained is [sic] and subsequently dried at 105° C. The determination of carbon in the product gave a carbon content of 1.7%. The product differs significantly from the platelet-shaped barium sulfate employed. The coated platelet-shaped barium sulfate is no longer wetted by water free from wetting agent.

EXAMPLE 2

Barium sulfate is precipitated from one litre of 0.5 molar barium chloride solution and one litre of 0.5 molar sodium sulfate solution in a precipitation reactor. The flow rates of the educts here are 100 ml/min. The precipitation product is filtered off and washed to a pH of 6. The washed filter-cake is dispersed in a dissolver at speeds of rotation of 1,000 $\min^{-1}$ for 15 min and adjusted to a solids content of 30% with CD water. During the dispersing in the dissolver, a barium excess is established by the addition of 0.1 molar barium hydroxide solution so that a pH of 12 is achieved. 23 g of oleic acid sulfonate are then added to the suspension and dispersing is carried out for a further 15 min. The suspension is washed to a pH of 9 and then adjusted to a pH of 6 with 0.1-molar sulfuric acid. The product is then freeze-dried. The barium sulfate prepared is no longer wetted by water free from wetting agent.

EXAMPLE 3

1,000 g of a nanoscale barium sulfate having a primary particle size of $d_{50}$=40 nm are suspended in 2 l of CD water in a stirred vessel. This suspension is subjected to dispersion with a batch bead mill using 1.2 mm glass beads at a temperature of T=35° C. and an energy input of P=40 W for 30 min. 0.3 molar barium hydroxide solution is added to the dispersed barium sulfate suspension with vigorous stirring, so that a pH of 11.5 is established. 100 g of oleylcetyl alcohol sulfate, Na salt are then added to the suspension and the mixture is stirred for a further 20 min. The pH of the suspension is then adjusted to 6.5 with 0.4-molar sulfuric acid. The product is then spray-dried. The carbon content of the product is 4.4%. After an extraction in ethanol, a carbon content of 4.3% is determined.

EXAMPLE 4

The barium sulfate powder prepared according to Example 3 is employed in an acrylate clear lacquer to improve the mechanical properties of the lacquer. For this, a grinding mixture with the following composition was prepared:

| | |
|---|---|
| Macrynal SM 510 n: | 42.3 parts by weight |
| Xylene/MPA 2:1: | 42.3 parts by weight |
| Barium sulfate: | 55.0 parts by weight. |

This grinding mixture is subjected to dispersion on a Skandex using 2 mm glass beads for 75 min. The dispersing fineness of the ground paste dispersed in this way is <5 μm. The grinding mixture was then diluted with curing agent and auxiliary solution as follows:

| | |
|---|---|
| Ground paste: | 39.4 parts by weight |
| MP: auxiliary solution: | 18.8 parts by weight |
| Desmodur N75: | 16.5 parts by weight |
| Macrynal SM 510 n: | 25.3 parts by weight. |

Lacquer coatings with wet layer thicknesses of 50 μm, 100 μm and 150 μm were produced on black glass plates and dried overnight. The remissions of the dried lacquer layers are:

| Wet layer thickness | Remission |
| --- | --- |
| 50 μm | 0.17 |
| 100 μm | 0.28 |
| 150 μm | 0.42 |

The pendulum hardness of the clear lacquer modified in this way was increased by 10% in comparison to the non-filled clear lacquer. It was also possible to increase the glass transition temperature of the clear lacquer significantly from T=56° C. to T=70° C. by the use of the modified barium sulfate.

EXAMPLE 5

When employed in a UV-curing parquet lacquer, the abrasion resistance is improved significantly.

The invention claimed is:

1. A process for the preparation of barium sulfate having an organically modified surface, comprising the steps of
 a) adding of a barium component to a concentrated barium sulfate suspension to provide an excess of barium; and subsequently
 b) adding an organic compound to the resultant suspension to form the barium sulfate having an organically modified surface having barium ions adsorbed on the surface thereof.

2. A process according to claim 1, further comprising the step of
 c) after-treating the organically modified barium sulfate particles with at least one of a functional silane derivative or a functional siloxane.

3. A process according to claim 1, wherein the barium sulfate in step a) has an average particle diameter $d_{50}$ or from 1 nm to 100 μm.

4. A process according to claim 1, wherein primary particles of the barium sulfate in step a) have a logarithmic particle size distribution with a median d of from 1 to 5,000 and a logarithmic particle size distribution with a geometric standard deviation of $\sigma_g < 1.5$.

5. A process according to claim 1, wherein the barium component is a water-soluble barium compound selected from the group consisting of barium sulfide, barium chloride and barium hydroxide.

6. A process according to claim 1 wherein the barium component is water soluble.

7. A process according to claim 1, wherein the organic compound form sparingly soluble compounds with barium ions.

8. A process according to claim 1, wherein the organic compound is an alkyl- or arylsulfonate, an alkyl or aryl sulfate, an alkyl- or arylphosphoric acid ester, wherein the alkyl or aryl radicals can be substituted by functional groups or fatty acids.

9. A process according to claim 1 wherein the organic compound is selected from the group consisting of an alkyl-sulfonic acid salt, sodium polyvinyl-sulfonate, sodium N-alkyl-benzenesulfonate, sodium polystyrenesulfonate, sodium dodecylbenzenesulfonate, sodium lauryl sulfate, sodium cetyl sulfate, hydroxylamine sulfate, triethanolammonium lauryl sulfate, phosphoric acid monoethyl monobenzyl ester, lithium perfluorooctanesulfonate, 12-bromo-1-dodecanesulfonic acid, sodium 10-hydroxy-1-decanesulfonate, sodium carrageenan, sodium 10-mercapto-1-cetanesulfonate, sodium 16-cetene-1-sulfate, oleylcetyl alcohol sulfate, oleic acid sulfate, 9,10-dihydroxystearic acid, isostearic acid, stearic acid and oleic acid.

10. A process according to claim 1, wherein the organic compound is added to the suspension with stirring or during a dispersing operation.

11. A process according to claim 2, wherein the organically modified barium sulfate particles in step c) are after-treated with at least one of a functional silane derivative or a functional siloxane.

12. A process according to claim 11, wherein the functional silane derivative or functional siloxane is an octyltriethoxysilane, a methyltriethoxysilane, a-methacryloxypropyltrimethoxysilane, a-glycidyloxypropyltrimethoxysilane, a-aminopropyltriethoxysilane, a-isocyanatopropyltriethoxysilane.

13. Barium sulfate having an organically modified surface prepared by a process according to claim 1.

14. Barium sulfate having an organically modified surface prepared by a process according to claim 2.

15. Barium sulfate having an organically modified surface with barium ions adsorbed on the surface thereof, wherein the barium sulfate has an average particle diameter $d_{50}$ is from 1 nm to 100 μm.

16. Barium sulfate according to claim 15 wherein primary particles of the barium sulfate have a logarithmic particle size distribution with a median of d is from 1 to 5,000 nm, and a logarithmic particle size distribution with a geometric standard deviation of $\sigma_g < 1.5$.

17. Barium sulfate prepared according to claim 12.

18. A composition comprising a polymeric material and the barium sulfate having an organically modified surface prepared according to claim 1.

19. The composition of claim 18, wherein the polymeric material is a thermoplastic, a thermoset or an elastomer.

20. A composition comprising an adhesive, a composite in combination with a metal or a ceramic material, a cosmetic, or a synthetic fiber and the barium sulfate of claim 13.

21. A composition comprising barium sulfate prepared according to claim 1 in an amount sufficient to act as a nucleating agent and a polymeric material, wherein the barium sulfate contains barium ions adsorbed on the surface of the barium sulfate particles.

* * * * *